United States Patent Office 3,564,054
Patented Feb. 16, 1971

3,564,054
ALIPHATIC COMPOUNDS CONTAINING DIFLUORAMINO GROUPS
Charles M. Orlando, Union, N.J., assignor to Esso Research and Engineering Company, a corporation of Delaware
No Drawing. Filed June 2, 1964, Ser. No. 372,126
Int. Cl. C07c *83/02, 83/06, 83/08*
U.S. Cl. 260—563    11 Claims This invention relates to a new class of energetic organic compounds containing a gem difluoramino structure with a hydroxyl or carbonyl-oxygen function attached to a vicinal carbon atom. It relates to a novel oxidation reaction for converting the hydroxyl function of a gem difluoramino secondary alcohol to a ketonic carbonyl-oxygen function. The gem difluoramino structure is $$—(NF_2)C(NF_2)—$$

The difluoramino organic compounds are considered energetic compounds; because owing to the $NF_2$ groups, they evolve a large quantity of heat when they undergo high-temperature decomposition reactions with metal fuels and oxygen-supplying oxidizer components used in solid rocket propellants.

In accordance with the present invention, peculiar reaction properties of the gem difluoramino organic compounds with a hydroxyl or carbonyl-oxygen function attached to a vicinal carbon atom have been discovered. The secondary alcohol hydroxyl function can be oxidized to the ketonic carbonyl-oxygen function, and the resulting product does not exhibit normal reactions of a ketone. This discovery has led to the formation of relatively stable organic compounds containing $NF_2$ groups in the gem difluoramino structure.

The difluoramino compound that serves as a prototype in the present invention is 3,3-bis difluoramino-2-butanol, which is made from 3-trifluoroacetoxy-2-butanone and which can be converted by oxidation to 3,3-bis difluoramino-2-butanone. The synthesis steps are summarized as follows:

(1) Preparation of gem $NF_2$ trifluoroacetate $$CH_3\overset{O}{\overset{\|}{C}}CH(O\overset{O}{\overset{\|}{C}}CF_3)CH_3 \xrightarrow{HNF_2/H^+} CH_3C(NF_2)_2CH(O\overset{O}{\overset{\|}{C}}CF_3)CH_3$$

(2) Transesterification of the gem $NF_2$ trifluoroacetate with methanol $$CH_3C(NF_2)_2CH(O\overset{O}{\overset{\|}{C}}CF_3)CH_3 \xrightarrow{CH_3OH} CH_3C(NF_2)_2CH(OH)CH_3$$

(3) $CH_3C(NF_2)_2CH(OH)CH_3 \xrightarrow[HAc]{CrO_3} CH_3C(NF_2)_2\overset{O}{\overset{\|}{C}}CH_3$ Complete details of the reactions and characterization of the products resulting from the synthesis steps are given in the following example.

EXAMPLE 1

Starting with the reactant 3-trifluoroacetoxy-2-butanone in a proportion of 0.0054 mmoles, this reactant was reacted with $HNF_2$ used in a proportion of 0.02 mmoles in a fuming sulfuric acid containing 20% $SO_3$ for a period of 14 hours with the temperature being permitted to raise from 0° to 25° C. The reaction product separated was 3,3-bis difluoramino-2-trifluoroacetoxy butane of higher than 95% purity in a theoretical yield of 68.8%.

The 3,3-bis difluoramino-2-trifluoroacetoxy butane product was reacted in mole proportion of 0.0041 mmoles with 0.0045 mmoles $CH_3OH$ at room temperature for 12 hours to obtain 3,3-bis difluoramino-2-butanol of 93.5% purity in a yield of 79.1%.

The 3,3-bis difluoramino-2-butanol product was reacted in glacial acetate acid with $CrO_3$ using 0.0071 mmoles of the gem $NF_2$ secondary butanol for 4 hours at room temperature to obtain 3,3-bis difluoramino-2-butanone as the oxidation reaction product of 95% purity in a yield of 65%.

Each of the mentioned products was analyzed for composition and structure including nuclear magnetic resonance and infrared spectral analyses.

For the oxidation with $CrO_3$, the $CrO_3$ was mixed with 1 cc. of glacial acetic acid and the gem $NF_2$ secondary alcohol was added and stirred at room temperature for 3 hours. The entire reaction mixture was distilled under vacuum and the distillate was treated with $Na_2CO_3$ until all the acetic acid was converted to sodium acetate. The product was then distilled from the sodium acetate and a clear distillate was obtained.

It was noted of interest that the gem $NF_2$ secondary butanol resisted oxidation by active $MnO_2$ and the starting alcohol was recovered. This showed that the gem difluoramino alcohol having the $NF_2$ groups and the OH on vicinal carbon atoms is stable under these conditions although other oxidizing agents may be used to obtain the reaction attained with the $CrO_3$.

In many efforts made to react the gem $NF_2$ ketone with $HNF_2$ using various acids including $SO_3$, fuming $H_2SO_4$, and others, it was found difficult to make the ketone undergo reaction. Chlorosulfonic acid at 25° C. gave some product that could be isolated for characterization. The stable gem $NF_2$ ketones may be used as compounds of moderately high energy in the manner of solvents or plasticizers in composite binders, oxidizers and fuels, as into solid rocket propellants.

In addition to the α-hydroxy and α-keto-acyclic aliphatic gem difluoramino compounds described, the analogous cyclohexyl derivatives have been prepared. 2-trifluoroacetoxy-cyclohexan-1-one was converted by reaction with $HNF_2$ to 2,2-bis difluoramino-1-trifluoroacetoxy cyclohexane which in turn was converted by methanol treatment into the 2,2-bis difluoramino-cyclohexan-1-ol and this by oxidation with $CrO_3$ in acetic acid formed the 2,2-bis difluoramino-cyclohexan-1-one having the structural formula:

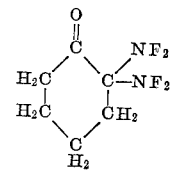

Other α-trifluoroacetoxy ketone starting materials may be selected from the following compounds: 2-trifluoroacetoxy-cyclobutanone-1, 2-trifluoroacetoxy-cyclopentanone-1, and 4,5-bis difluoramino-3-trifluoroacetoxy-pentanone-2.

The general type formulas of the aliphatic (acyclic and cyclic) reactants used and products obtained according to the present invention are as follows:

$$R \cdot CO \cdot CH(\cdot O — \overset{O}{\overset{\|}{C}}CF_3) \cdot R'$$

$$R \cdot C(NF_2)_2 \cdot \overset{O}{\overset{\|}{C}} \cdot R'$$

$$R \cdot C(NF_2)_2 \cdot CH(OH) \cdot R'$$

$$R \cdot C(NF_2)_2 \cdot \overset{O}{\overset{\|}{C}} \cdot R'$$

wherein R and R' are hydrocarbon moieties such as alkyl methylene groups bonded to form a cyclic structure. These hydrocarbon moieties may contain substituents ·R and R' may contain a total of 2 to 4 carbon atoms.

Using any of the trifluoroacetoxy ketones in which the trifluoroacetoxy group is attached to the carbon atom alpha or vicinal to the carbon of the ketonic carbonyl group, the steps of preparing the gem $NF_2$ compound in which the $NF_2$ groups replace the oxygen of the ketone function is carried out by treatment with $HNF_2$ followed by the tranesterification to replace the trifluoroacetoxy group by a hydroxyl group to form a secondary alcohol and then the hydroxyl group can be oxidized to replace the hydroxyl group by oxygen in a ketonic carbonyl function. The intermediate gem $NF_2$ secondary alcohols are useful products even without oxidation since they are energetic compounds and can be employed for reactions of the hydroxyl group with other reactants, as for example, in a reaction with perfluoroguanidine followed by fluorination to replace the hydroxyl group by a tris($NF_2$) methoxy group or they may be used in esterification reactions such as nitration or carboxylic acid esterification.

The invention described is claimed as follows:

1. Process for the synthesis of an energetic organic compound having $2NF_2$ groups attached to a single carbon atom with an oxygen-containing function attached to a vicinal carbon atom which comprises reacting $HNF_2$ with a trifluoroacetoxy ketone having the trifluoroacetoxy group attached to a carbon atom vicinal to the carbon atom in the carbonyl group of the ketone to replace the oxygen of the carbonyl group by $2NF_2$ groups and recovering a resulting reaction product which has the trifluoroacetoxy group attached to a carbon atom vicinal to the carbon atom having a gem $NF_2$ structure, $$—(NF_2)C(NF_2)—$$

2. A process as defined in claim 1, wherein the product having a gem $NF_2$ structure with the trifluoroacetoxy group attached to a vicinal carbon atom is reacted with methanol to replace the trifluoroacetoxy function by a hydroxyl function and a resulting gem $NF_2$ secondary alcohol is recovered.

3. A process as defined in claim 2, in which the gem $NF_2$ secondary alcohol is oxidized by chromium oxide in glacial acetic acid to replace its hydroxyl function by oxygen in a ketonic carbonyl function.

4. A process for preparing 3,3-bis difluoramino-2-butanone which comprises reacting 3-trifluoroacetoxy-2-butanone with $HNF_2$ in fuming sulfuric acid to form 3,3-bis difluoramino-2-trifluoroacetoxy butane as reaction product and recovering said product.

5. Process for the synthesis of 3,3-bis difluoramino-2-butanol which comprises reacting 3,3-bis difluoramino-2-trifluoroacetoxy butane with methanol to replace the trifluoroacetoxy group by a hydroxyl group, and recovering 3,3-bis difluoramino-2-butanol as product.

6. Process for the synthesis of 3,3-bis difluoramino-2-butanone which comprises oxidizing 3,3-bis difluoramino-2-butanol in glacial acetic acid mixed with chromium oxide, and recovering 3,3-bis difluoramino-2-butanone as the resulting oxidation product.

7. An aliphatic compound having two difluoramino groups attached to a carbon atom that is linked to a vicinal carbon atom attached to oxygen in a function selected from the group consisting of ester, hydroxyl, and ketonic carbonyl, said compound having a formula selected from the group consisting of $$R·C(NF_2)_2·CH(·O\overset{O}{\underset{\|}{C}}—CF_3)·R'$$

$$R·C(NF_2)_2·CH(OH)·R'$$

$$R·C(NF_2)_2·\overset{O}{\underset{\|}{C}}·R'$$

wherein R and R' represent hydrocarbon moieties selected from alkyl groups and methylene groups bonded in a cyclic structure, said hydrocarbon moieties having a total of 2 to 4 carbon atoms.

8. The second alcohol having the structural formula:

$$CH_3C(NF_2)_2CH(OH)CH_3$$

9. The ketone having the structural formula:

$$CH_3C(NF_2)_2\overset{O}{\underset{\|}{C}}CH_3$$

10. The secondary alcohol having the structural formula:

11. The ketone having the structural formula:

References Cited

Hoffman et al.: Chem. Reviews, vol. 62, pp. 12 to 18 (1962).

LELAND A. SEBASTIAN, Primary Examiner

U.S. Cl. X.R.

149—109; 260—487, 584